United States Patent Office 3,119,318
Patented Jan. 28, 1964

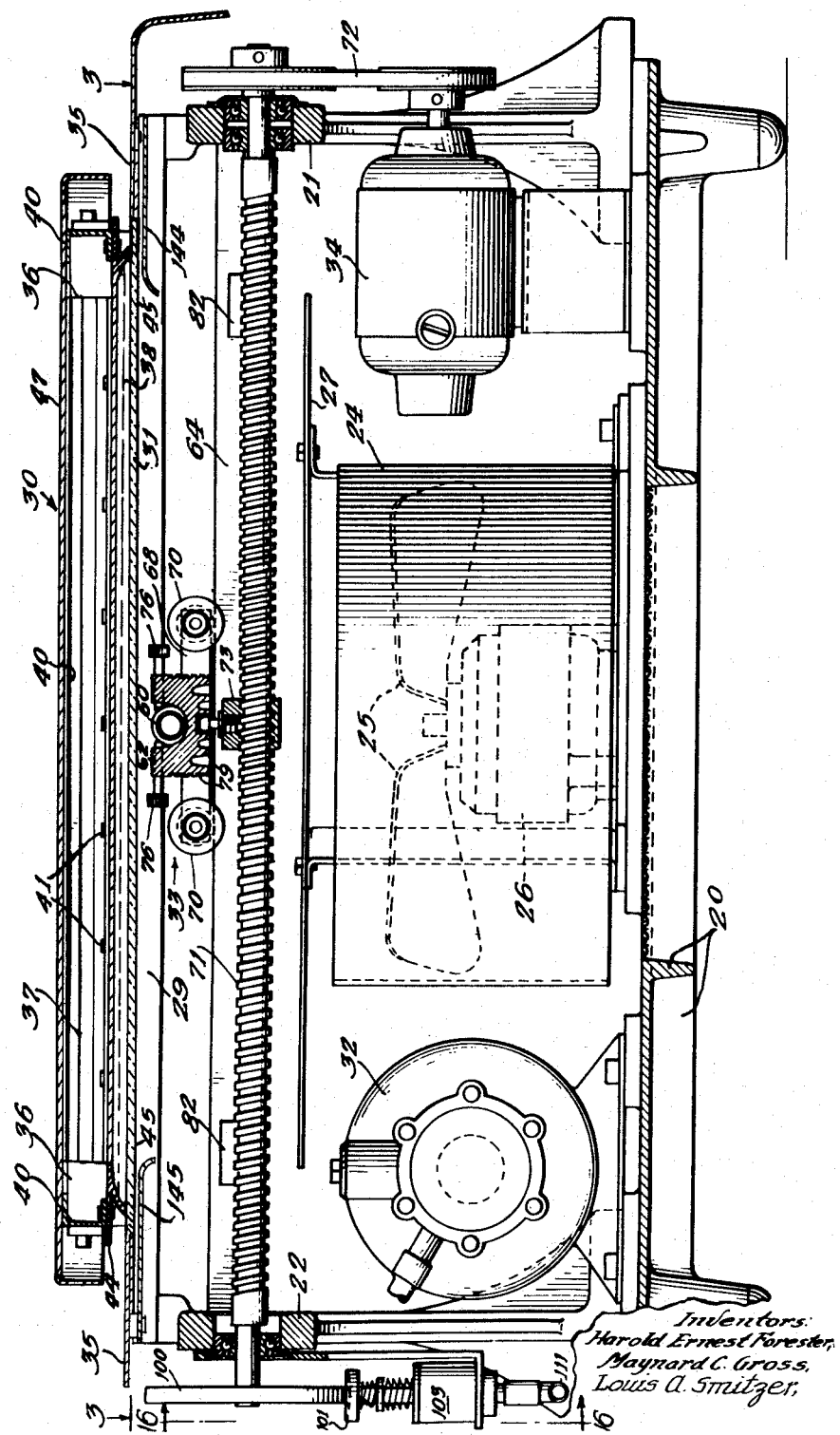

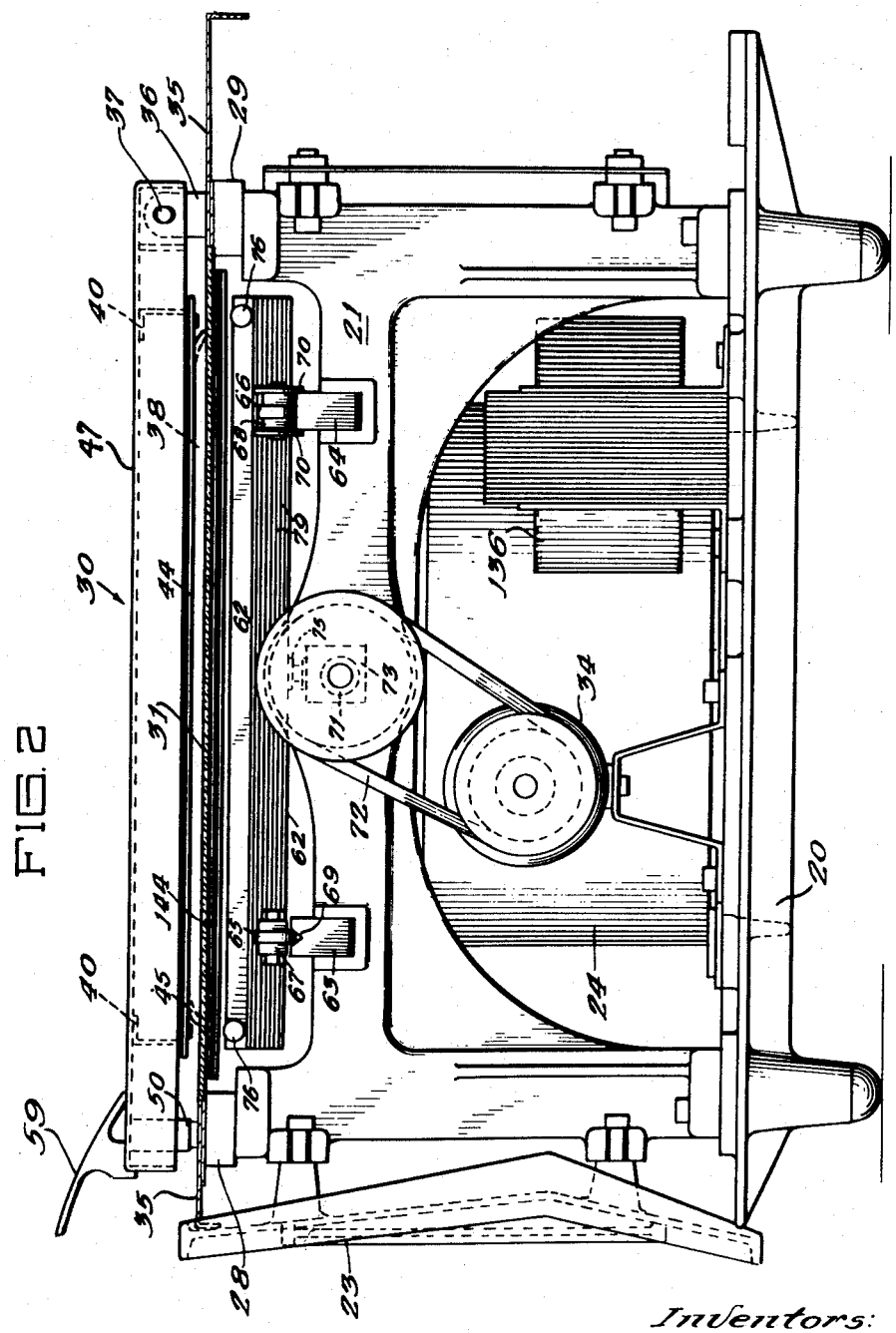

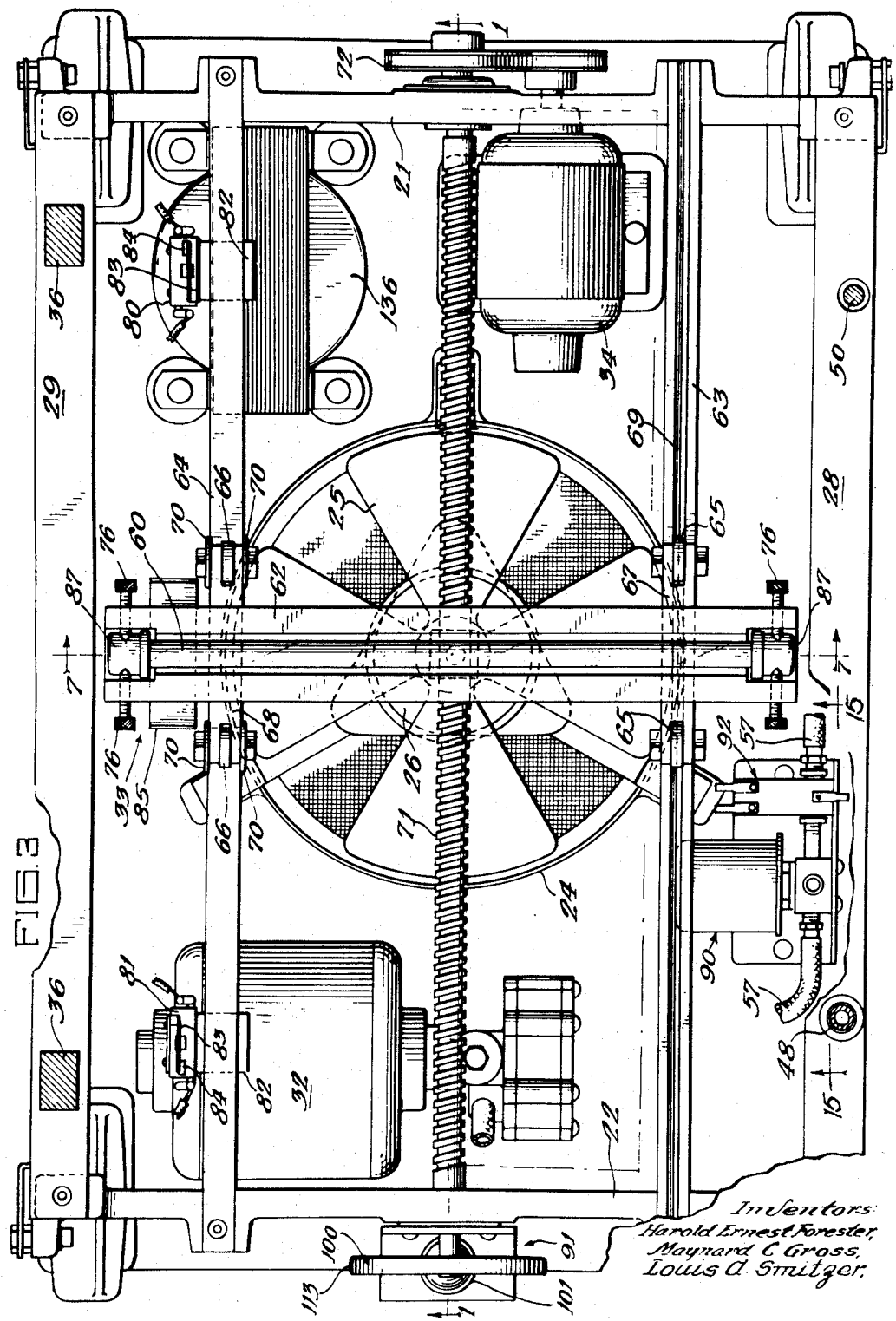

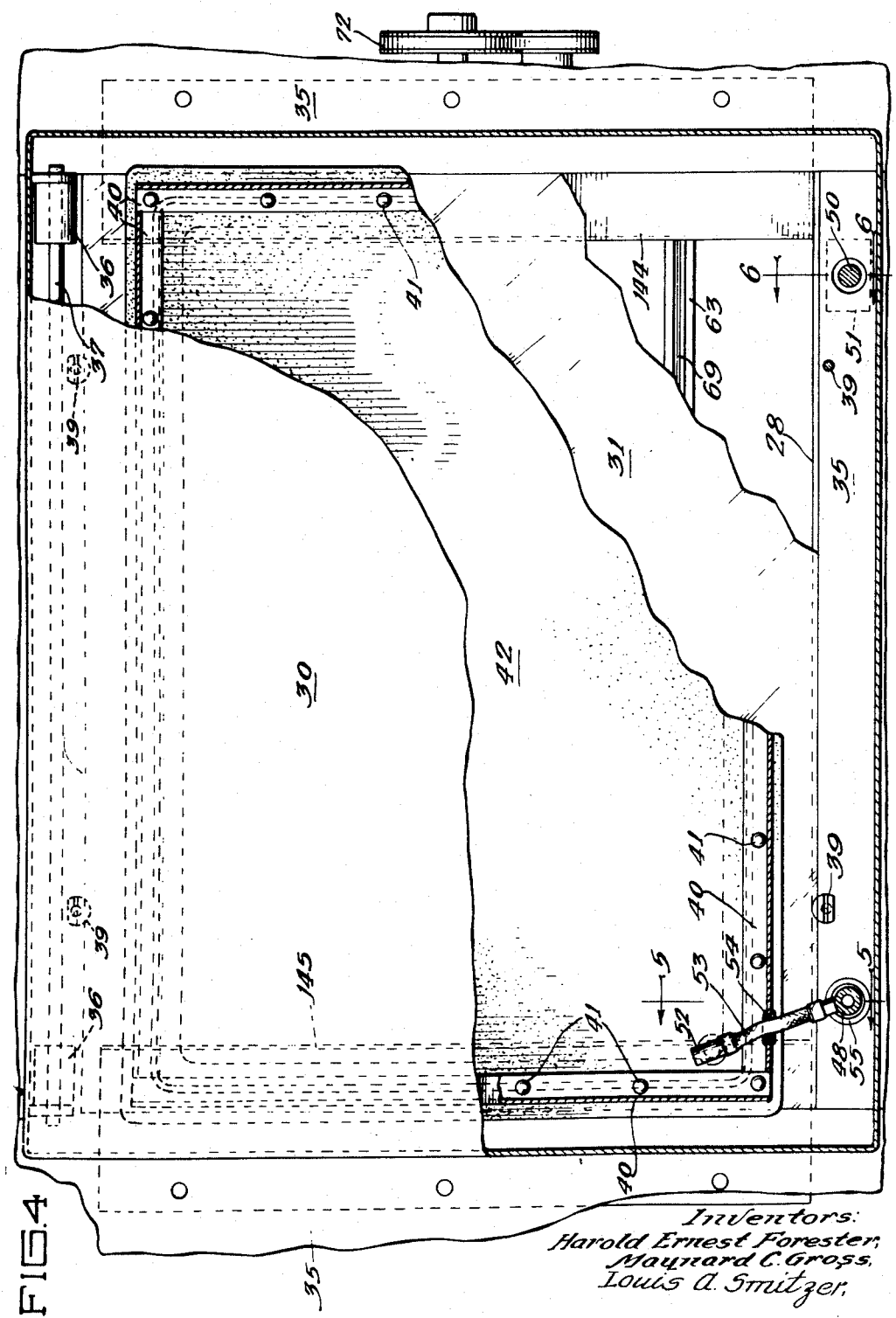

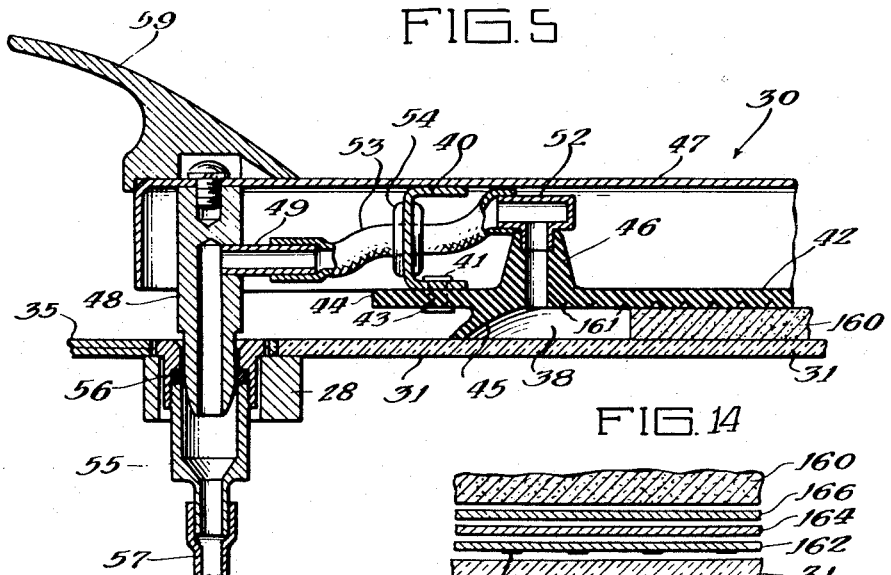
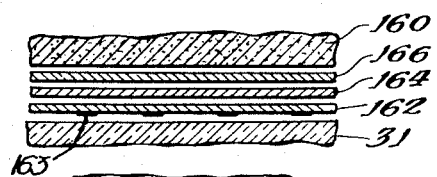
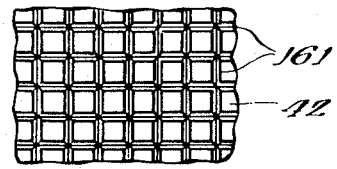
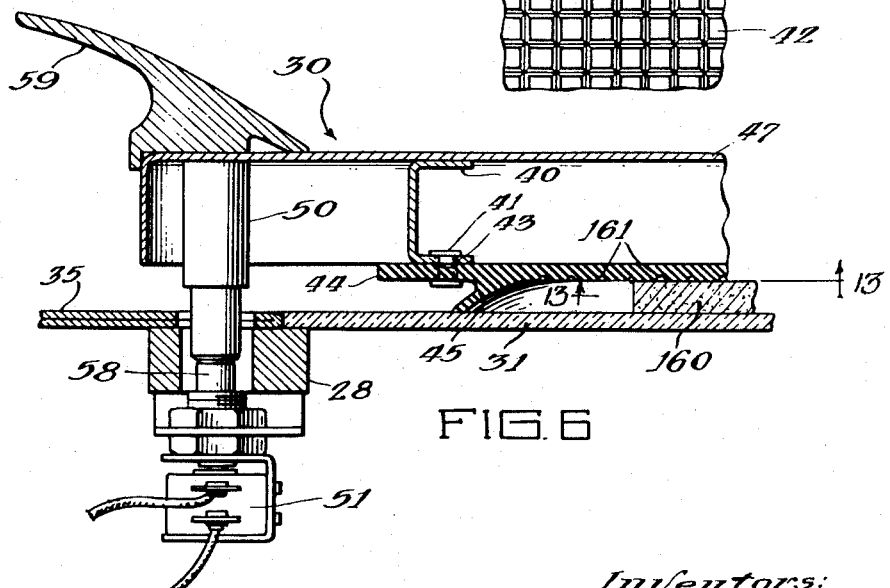

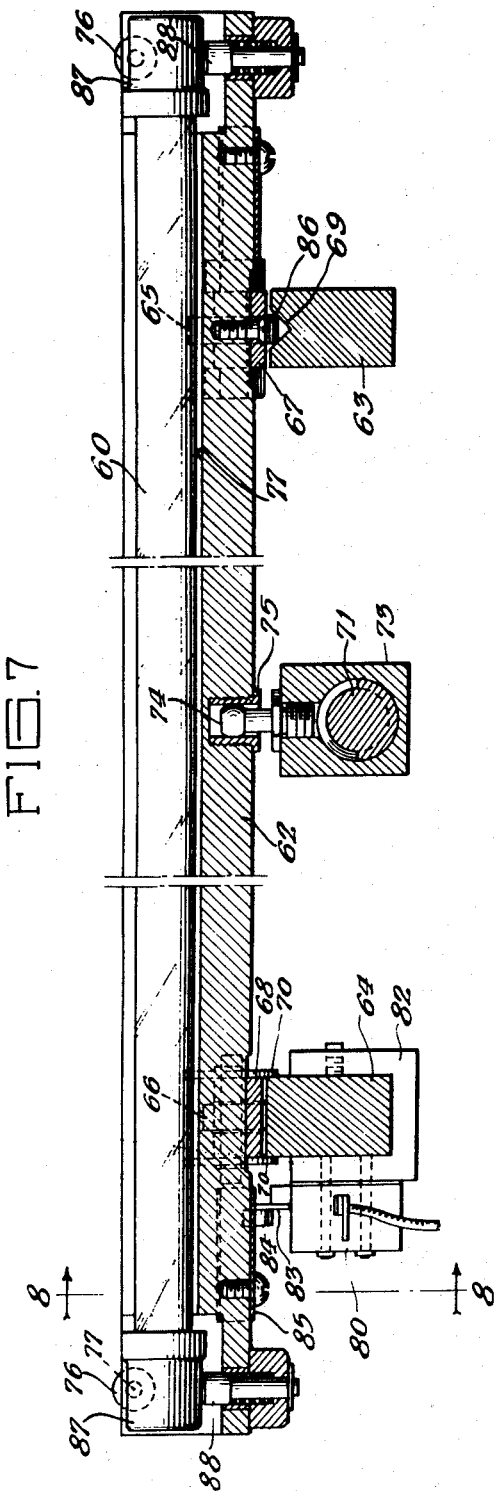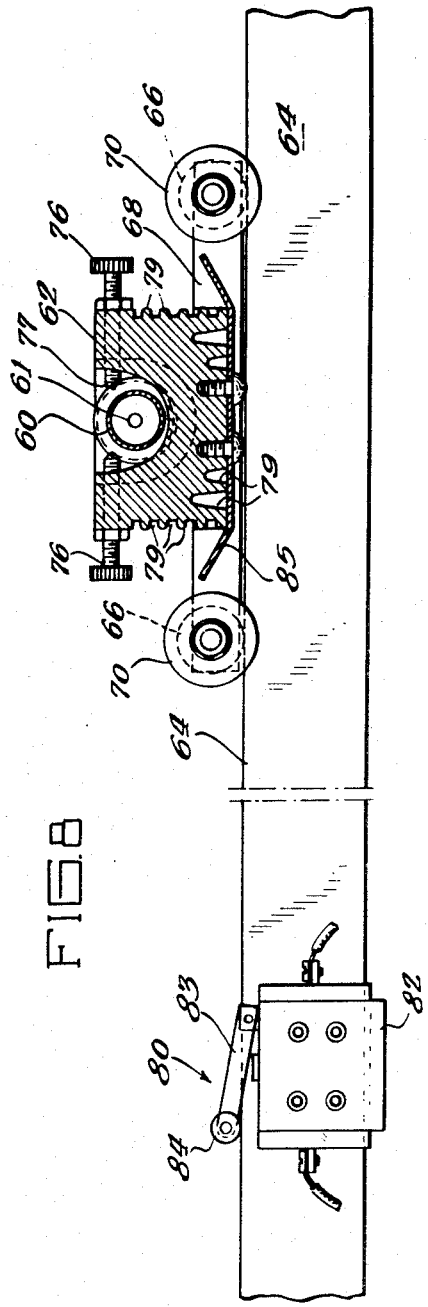

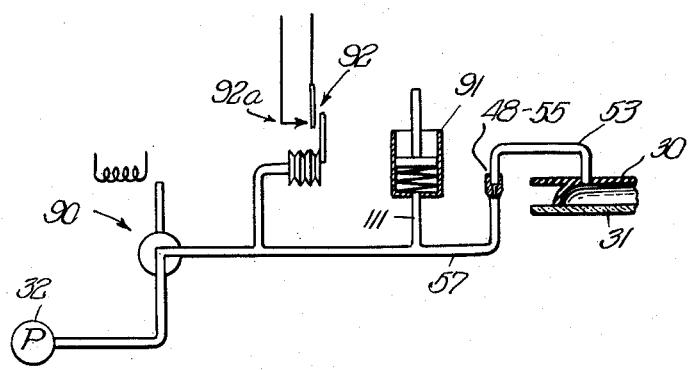
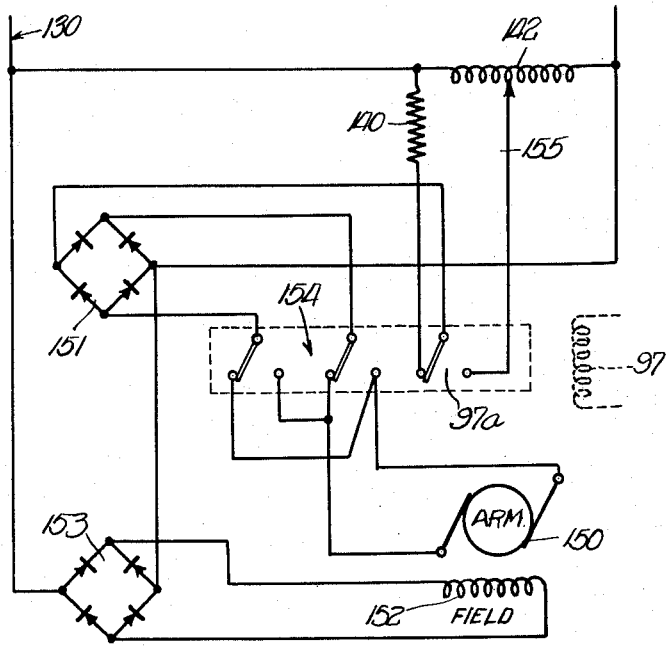

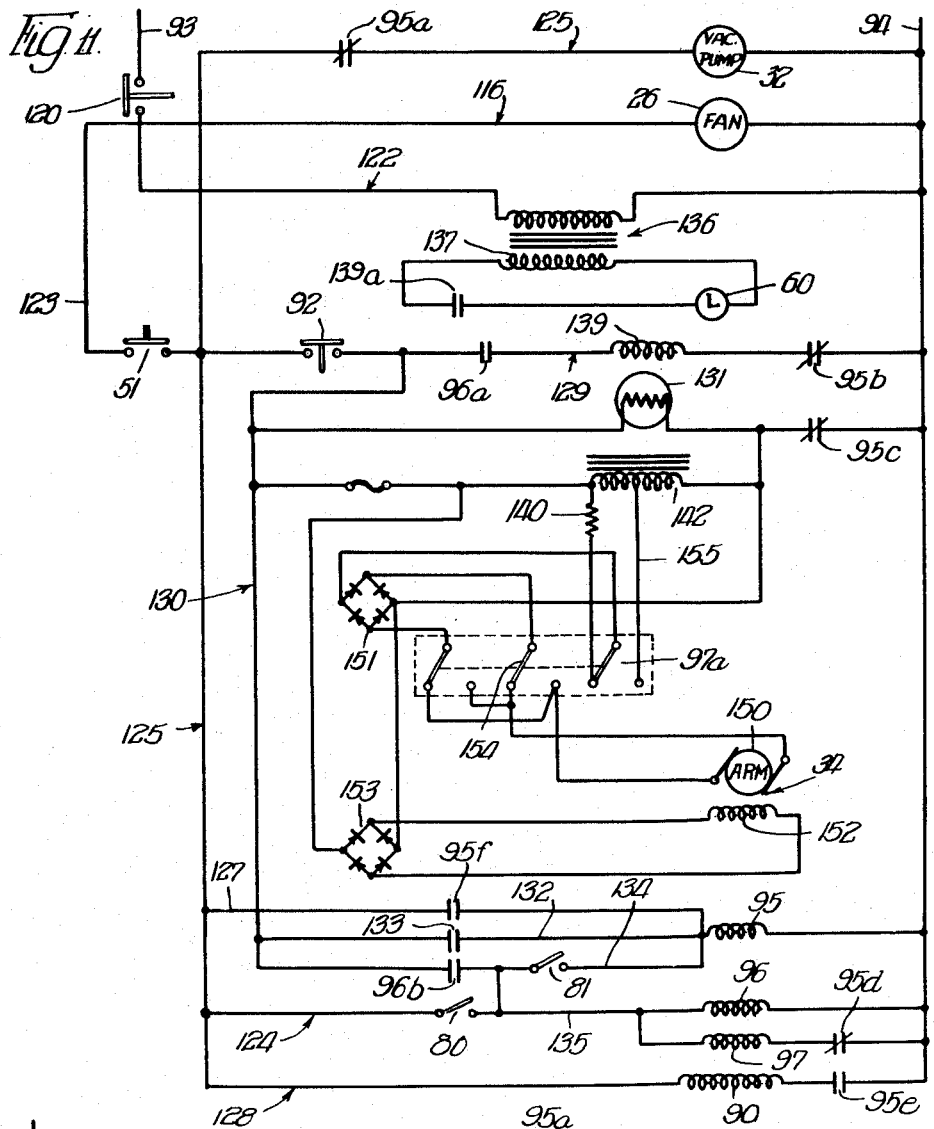
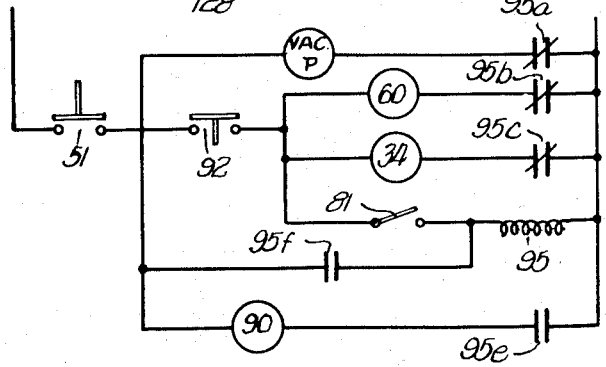

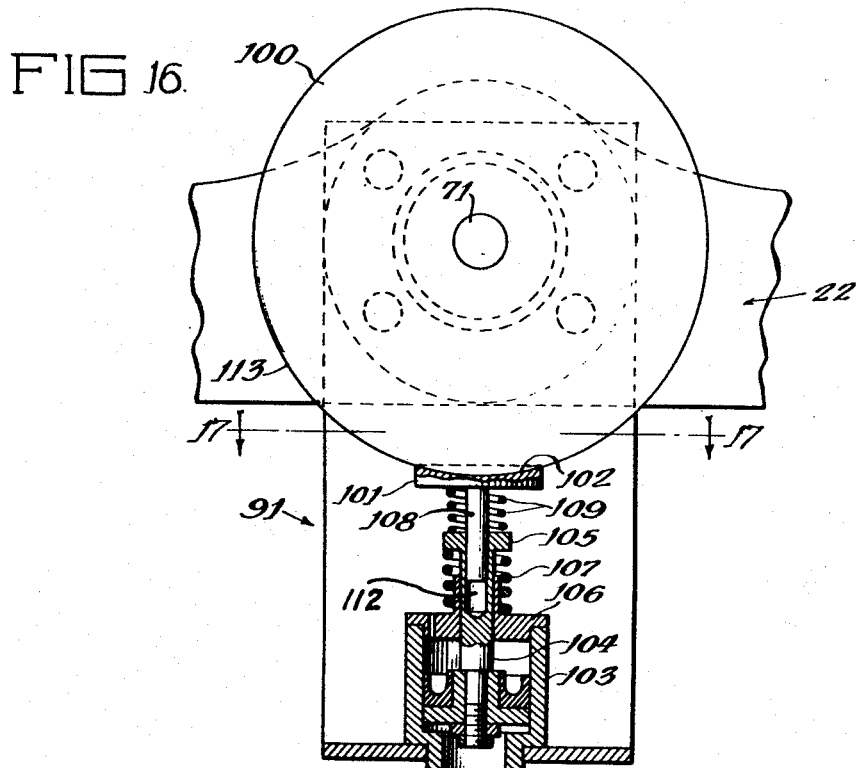
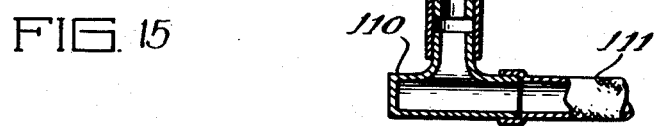
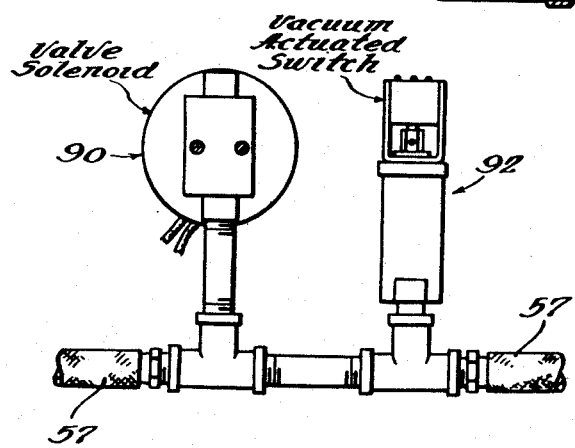
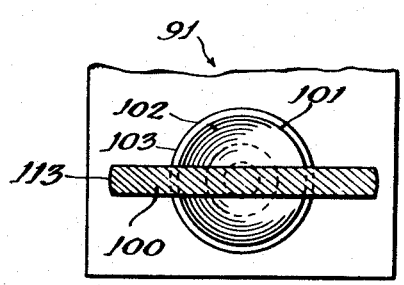

3,119,318
VACUUM BLANKET AND FOCUSING MEANS FOR EXPOSURE DEVICE
Harold E. Forester, Skokie, and Louis A. Smitzer and Maynard C. Gross, Chicago, Ill., assignors, by mesne assignments, to Ditto, Incorporated, Chicago, Ill., a corporation of Delaware
Filed Sept. 16, 1960, Ser. No. 56,480
11 Claims. (Cl. 95—76)

The present invention relates to an improved vacuum frame type of printing device and, in particular, one which is well adapted for carrying out the thermal transfer process in which the requirements of accuracy of focusing are greater than in certain other types of printing mechanisms.

Although the invention is described with particular reference to a device of the thermal transfer type of reproduction, certain aspects of the invention are equally applicable to other types of printing machines which embody a vacuum frame. The term "vacuum frame" is commonly applied in the photographic and analogous arts to indicate a device for maintaining two or more sheets in intimate contact with each other for print making purposes. The vacuum frame proper is removably mounted for cooperation with a transparent supporting base, and includes a flexible blanket and a supporting frame therefor. The components of a vacuum frame type of exposure device, in addition to the vacuum frame and the transparent base, include a vacuum pump for exhausting the air from the space between the blanket and the transparent base, and the radiant energy source which is located on the opposite side of the transparent base from the vacuum frame. In some instances, the radiant source is a traveling energy source with the result that driving means must be provided for the same.

Accordingly the basic objective of the present invention is to provide a machine of the type described having an improved vacuum frame which serves to maintain the superimposed sheets in a rigid planar condition and free from wrinkles, air bubbles, and the like.

Another object of the present invention is to provide an improved mounting for the traveling energy source, whereby the same may be maintained in all positions equidistantly spaced from the plane of the superimposed sheets in order that heat generating portions of the imaged original sheet may be maintained exactly in the focal plane of the energy source to provide fine delineation of the characters to be reproduced on the copy sheet.

A further object is to provide means for mounting the traveling energy source in such a manner that it will be free from binding and similar physical actions, especially those which arise from temperature variation and which would tend to modify or vary the uniform rate of movement of the energy source. The thermal transfer process depends upon uniformity of rate of motion and, therefore, in order to secure uniform density of copy, it is necessary to avoid any variation in the rate of travel of the energy source.

A still further object is to provide improved sheet contacting means which comprises a tensioned blanket in combination with a porous spacing member.

With these and various other objects in view, the invention may consist of certain novel features of construction and operation, as will be more fully described and particularly pointed out in the specification, drawings and claims appended thereto.

In the drawings which illustrate an embodiment of the device and wherein like reference characters are used to designate like parts—

FIGURE 1 is a transverse, sectional elevation along lines 1—1 of FIGURE 3 showing a preferred embodiment of this invention;

FIGURE 2 is a right side elevation of the device shown in FIGURE 1;

FIGURE 3 is a plan section taken along line 3—3 of FIGURE 1;

FIGURE 4 is a plan view, partly in section, showing the cover;

FIGURE 5 is a section along line 5—5 of FIGURE 4 showing the coupling in the vacuum line;

FIGURE 6 is a section along line 6—6 of FIGURE 4 showing the cover switch;

FIGURE 7 is a longitudinal section along line 7—7 of FIGURE 3, showing the energy source and the mounting therefor;

FIGURE 8 is a transverse section along line 8—8 of FIGURE 7;

FIGURE 9 is a diagram illustrating the vacuum system;

FIGURE 10 is a diagram showing the electrical relationship of the principal elements of the device;

FIGURE 11 is a wiring diagram;

FIGURE 12 is a detailed wiring diagram showing the electrical connections for the variable speed reversing motor;

FIGURE 13 is a fragmentary bottom view of the blanket showing the grooves;

FIGURE 14 is an enlarged view showing the relationship of the superimposed sheets to each other and to the adjacent parts;

FIGURE 15 is an elevational view taken substantially along line 15—15 of FIGURE 3 and showing the valve solenoid and the vacuum actuated switch;

FIGURE 16 is an end elevational view partially in section taken along line 16—16 of FIGURE 1 and showing the vacuum brake; and FIGURE 17 is a plan section taken along line 17—17 of FIGURE 16.

The thermal transfer process relies on the differential absorption of infrared radiation by a subject of which reproductions are to be made. Basically, the subject is made up of printed, typed, or handwritten images on a paper stock. The images so created on the sheet of paper must have suitable infrared absorptive-heat generating properties and the paper base must be non-infrared absorptive.

Thus, the subject is capable of having created a heat pattern which corresponds to the infrared absorptive, heat generating characters.

The heat image, once having been created, must be utilized within the assembly of sheets in order to effect the transfer from the transfer composition which is activated by the heat image.

The exposure equipment to accomplish this transfer must do so within an extremely short span of time. The heat image must be utilized instantaneously.

Extended study of the problems has revealed that the mechanical device to carry out the exposure of the assembly of sheets must first maintain those sheets in a rigid planar condition during exposure. Just as important as keeping the sheets together, it was found that the best utilization of the heat image occurs when the sheets are maintained under pressure. Yet, this pressure must be completely even and uniform, devoid of air entrapment, since the air bubbles would result in creating a heat image of its outline. With regard to wrinkles and creases, they too absorb the infrared radiation to create conflicting heat patterns.

Exposure under this condition of uniform pressure appears to place the sheets into such intimacy of contact that conduction of the heat image to the transfer material is instantaneous.

In addition to the requirement of keeping the sheets in a rigid-planar condition, the infrared radiation must be directed at the subject under such circumstances that maximum utilization of the energy occurs. Therefore, the infrared energy must be focused onto the subject in order to attain the greatest energy level during a minimum of exposure time.

The energy source must remain in this condition of focus during its traverse, otherwise the energy exposure will not be the same across the length of the sheet. The device must be so constructed so as to provide means for retaining the energy source where it is effecting an exposure, operating in a plane that is parallel to the plane of exposure. The equipment, to accomplish this must be of such simplicity to permit field servicing and adjustments and be rugged in construction to withstand continuous operation.

General Organization

For illustrating the present invention an exposure device has been selected similar to that shown in our Patent No. 3,007,390, granted November 7, 1961, and entitled Exposure Device.

The framework of the device, best shown in FIGURES 1, 2 and 3, comprises a base 20 and right and left end members 21 and 22. The framework is intended to be included in a housing which is not shown, except for a decorative front grill 23, which may be suitably secured to the end members. Mounted over a suitable opening in the base 20 is a fan housing 24, which includes a fan 25 and a fan motor 26 and which supports a baffle 27. Connecting the upper edges of the end members 21 and 22 are front and rear support bars 28 and 29. The principal elements of the device comprise a hingedly mounted vacuum frame 30 providing a cover below which is disposed transparent sheet supporting base 31, such as a glass plate. Within the hingedly mounted vacuum frame is provided the tensioned rubber blanket 42. Supported by the framework are electrically operated vacuum pump 32, a travelling radiant energy source 33, and the drive motor 34 as shown in FIGURE 3. The front and rear edges of the glass plate 31 rest on the support bars 28 and 29, and may be removably secured thereto by suitable clips, not shown. Filler strips 35 also overlie the support bars and abut the glass plate 31 so as to provide a flush working surface, the filler strips also extending along the side edges of the glass plate and forming a continuation of the housing. Lugs 36, as shown in FIGURES 2 and 4 project upwardly from bar 29 and extend through the back filler strip and provide means on which the vacuum frame may be hingedly mounted by a pin 37.

The Vacuum Frame

The construction of the vacuum frame is shown in FIGURES 4, 5 and 6, and comprises a rectangular frame member 40 comprised of U-shaped strips. A series of headed pins or buttons 41 depend from the lower surface of the frame and the resilient blanket 42, having correspondingly located holes 43, is mounted on the pins 41. The holes 43 are spaced inwardly from the marginal portions 44 to facilitate manipulation of the blanket 42 incident to installation. The blanket 42, which is preferably formed of rubber or a similar material, in its relaxed form is considerably smaller than the rectangular frame. Thus, when mounted, the blanket is under substantial tension. The button and hole arrangements provide a convenient mounting means for the blanket, and at the same time, they provide the means for uniformly mounting the blanket under a condition of tension without the necessity of any additional retaining strips or back support. The mounting just described uniquely integrates the vacuum blanket with the hingedly mounted lid.

Disposed just inwardly from the series of holes 43 and extending around all four sides of the blanket is a continuous lip 45, which is adapted to engage the glass plate 31 to provide a vacuum seal, the lip extending outwardly and downwardly as shown in FIGURE 5. A nipple 46 is formed in the blanket at a point adjacent the lip 45. The frame 40 and blanket 42 are mounted within an enclosure 47 which is provided with a handle 59 at its front edge so that the vacuum frame can be raised and lowered. The front end of the enclosure is provided with a downwardly extending pin 50, the lower end of which is received within the front support bar 28. Said pin 50 is an actuating pin for engaging the plunger 58 of a cover switch 51 which is secured to the underside of the front support bar 28.

The nipple 46, which is formed in the blanket at a point adjacent the lip 45, is connected to the flexible tube 53 which then extends rearwardly inside the lid and passes through the web of the frame member 40 and passes into the frame work through filler strip 35 to communicate with tube 57, which constitutes the vacuum line connected with the vacuum pump 32, as shown in FIGURE 9.

In operation, after the superimposed sheets have been placed on the glass plate 31, the vacuum frame 30 is lowered into its operative position as shown in FIGURES 4, 5 and 6, the lip 45 forming a seal for the space 38 which is enclosed by the blanket 42 in the glass plate 31. The closing of the cover starts the vacuum pump 32 and the vacuum created within the space 38 effectively locks the parts together until the vacuum is automatically released by means hereinafter described.

Effecting Sheet Contact

As shown in FIGURE 14, the original sheet 162, having printed or typed characters thereon 163, is laid face down on the glass plate 31. A transfer sheet 164, having a suitable coating 165, is then laid coating side up, over the original, and the copy sheet 166 is placed on the transfer sheet. The relationship may be reversed to make reflex prints and the transfer sheet may be substituted with other types of transfer sheets in making other thermal prints. Other types of sheet assemblies, such as may be required in the photolithographic art and the exposure of presensitized metal plates, under the sheet contacting means provided in this invention may be accomplished by this exposure device.

The blanket 42 is mounted under tension so that contact with the superimposed sheets is accomplished progressively across its surface so as to have an ironing-out effect. The effect of mounting the blanket on the vacuum frame 30 under a condition of substantial tension results in the yieldable resilient rubber blanket first contacting the superimposed sheets in those areas corresponding to the areas on the blanket having the least resistance to the action of the pressure difference created. This is believed to occur in the center of the blanket and then contact of the superimposed sheets progresses from the center outwardly to provide an ironing-out or smoothing out effect. The application pressure in order to hold the superimposed sheets in a rigid planar position during exposure by means of the tensioned blanket has been found to eliminate air pockets, bubbles, wrinkles and the like which show up as definite irregularities when making an infrared transfer.

Slight variations in the resilience or thickness of the blanket from point to point introduces the possibility that contact will not be progressive with the result that entrapped areas may be formed which tend to be self-sealing, thus forming bubbles and wrinkles which not only interfere with the intimate contact required in all types of analogous printing operations, but which also provide heat reflecting surfaces which are disposed at an angle to each other in such a manner that streaking due to uneven heating or localized overheating may result in the case of the thermographic process.

Therefore, it was found that the contacting surface of the blanket must be adapted to relieve any air entrapped between the blanket and the superimposed sheets. To prevent the formation of such self-sealing areas, the blanket surface has a series of intersecting grooves 161, as shown in FIGURE 13 to provide escape channels for any entrapped air.

The grooves present the further problem of making impressions in the transfer sheet when pressure is applied, although the problem of entrapment has been eliminated. In order to avoid the consequent inequality of contact pressure, a porous cushion 160, as shown in FIGURES 5 and 6 is secured to the blanket 42, or otherwise interposed between the blanket and the superimposed sheets.

The porous cushion 160 is preferably in the form of soft paper stock similar to blotter stock and serves to equalize the contact pressure. A thin layer of soft sponge rubber material has also been found to perform quite satisfactorily. As the air is evacuated from the space formed by the blanket and the transparent support base, the blanket is urged toward the support base, transmitting the pressure in a progressive manner to the superimposed sheets, through the porous cushion. The grooves enable the blanket to be brought into complete intimate contact with the cushion which, in turn, progressively applies pressure to the sheets placing them quite rapidly and uniformly in a condition of intimate contact and maintaining them in a rigid planar condition during exposure.

With regard to the thermoprinting process, the superimposed sheets must remain in their planar rigid relationship to one another at the end of exposure until separated by the operator. Here, the grooved tensioned blanket at the end of the exposure cycle performs in a manner so that it breaks clean from the superimposed sheets so as not to disturb the relationship achieved as a result of such an exposure.

When the vacuum ceases to be drawn and the chamber returns to atmospheric pressure, the equalization of pressure within the chamber causes the yieldable resilient blanket to spring back to a condition of normal tension and moving with it the porous cushion which separates completely and uniformly from the sheets. When the chamber is permitted to come to atmospheric pressure, equalization within the chamber is complete because of the intersecting grooves so that there is no "suction cup" effect, which would cause the sheets to lift up with the lid as the operator retrieves the sheet from the transparent support base. Thus, the superimposed sheets at the end of exposure remain in contact and are not prematurely separated by the blanket contacting means.

The unique blanket mounting provides an improved contacting means for urging the sheets into a rigid planar condition for proper exposure and at the conclusion of the exposure cycle, the vacuum frame may be lifted away from the transparent support base without disturbing the position of the transfer sheet and the copy sheets.

*The Traveling Energy Source*

The energy is required to travel in a plane parallel to the plane of the super-imposed sheets and in a condition of continuing focus. Additionally, the energy source must expose each segment of the subject for the same length of time since the quantum of radiation absorbed is a function of the time of exposure of a given source. It is, therefore, important to making a successful exposure that the energy source move at a near constant rate of speed without any deceleration due to binding or obstruction due to thermal expansion of the parts.

A suitable source of radiant energy is provided which, in the embodiments shown, comprises a filament type lamp 60, which is located beneath the glass plate 31. The tubular lamp is provided with a linear filament 61, thus providing a linear energy source which is focused on the characters of the original 162. The exposure operation is effected by causing the energy source to travel between two terminal positions located at opposite ends of the glass plate to each other, and control of exposure is effected by regulating the rate of traverse. According to the present invention, therefore, the driving mechanism for the traveling energy source serves as the timing means which controls the pressure. Means shown in FIGURES 7 and 8 are provided for mounting the lamp 60 so that the filament 61 thereof will be maintained in a common plane throughout its travel to provide accurate focusing, and so that the rate of traverse will be uniform, thus providing for uniform exposure.

The lamp 60 is mounted in a carriage 62, which travels on transversely disposed front and rear rails 63 and 64, the latter being supported by the end members 21 and 22. The carriage 62 is supported by means of front and rear trucks 67 and 68, each of which are provided with wheels 65 and 66, respectively, which ride on the rails 63 and 64.

In order to maintain the carriage perpendicular to the line of travel, it is secured at one end to the front truck 67, and the front truck, in turn, is designed to maintain parallelism with the front rail 63 to a high degree of accuracy, this being accomplished by means of a V-shaped groove 69, in which the front wheels 65 ride as shown in FIGURE 7. The front truck 67 is secured to the carriage by one or more screws 86. It will be observed that the lower surface of the front truck clears the upper surface of the rails 63, the screw 86 also serving to adjust this clearance so that positive contact with the rail is made only by the corner edges of the front wheel 65.

The carriage 62 at its rear end is not secured to the truck 68, but merely rests thereon so as to permit the small amount of sliding action which is necessary to accommodate thermal expansion of the carriage. In order to maintain the truck 68 in position with the rear rail 63, the wheels 66 may be provided with end flanges 70. The flanged portions of the wheels straddle the rear rail so that the movement of the rear trucks thereon is essentially parallel to the rear rail.

The carriage is mounted transverse to both trucks and also transverse to the front and rear rails. The carriage is fixed to the front truck which is mounted on the front rail, but the mounting on the rear rail is by means of fitting the carriage into a U-shaped channel on the rear truck. The carriage, therefore, mounted in this fashion moves transversely to the rail means, traversing the entire undersurface of the transparent support base.

In operation, the carriage and the rail means and truck means are required to operate in an environment of high temperatures in view of the fact that the radiant energy source may be of the infrared variety. Thus, the carriage will experience substantial increases in its temperature which could result in thermal expansion.

Since the thermal transfer process depends on precise exposure techniques, it is critical that the focal plane of the energy source remain constant throughout the exposure cycle. Therefore, the front rail means with its V-shaped groove maintains the front truck so that its line of travel is always parallel with the front rail. Exact alignment is maintained of the entire carriage with the rail means by permitting the carriage to expand freely in the rear truck. Thus, as the carriage experiences thermal expansion, any dimensional increase in the width of the carriage will be through the panel of the rear rail and avoids binding and cocking between the trucks on the respective rails assuring thereby a uniform rate of traverse.

Uniformity is also obtained by the use of a screw type driving means which provides positive driving action and a smoothness of motion which is not found in belt and chain drives.

A drive screw 71 is journalled in end members 21 and 22 and is driven from the motor 34 by means of a belt and pulley arrangement 72. A nut 73 mounted on the screw is shown in FIGURE 7 and projecting from the upper surface thereof is a ball pin 74 which is received within a hardened bushing 75, located in the lower surface of the carriage 62. Thus, the carriage is moved transversely by rotation of the drive screw 71, and the ball pin and bushing arrangement 74 to 75 permit a limited amount of movement of the carriage in the forward and backward direction to accommodate thermal expansion of the carriage.

Focusing the Energy Source

The lamp or energy source used is provided with an elliptical reflector which is capable of concentrating the radiation. The lamp is of the linear filament type so that the irradiation of a large area may be accomplished at each exposure. Focusing of the lamp accomplishes the irradiation of the subject in a manner that is uniform across the length of the filament and at the same time maximizes the radiation which is available.

The means for accomplishing the focusing must be accurate, simple and retain a fixed position.

The energy source 60, as shown in FIGURE 7, has its transparent tubular portion mounted in ceramic end caps 87. Referring to FIGURE 8, the lamp is shown mounted in the carriage 62 by means of pointed screws 76 which engage the terminal caps 87 of the lamp. The carriage is provided with a reflector surface 62, which serves to focus the rays of the linear filament at a focal plane immediately above the upper surface of the glass plate 31, in which focal plane the characters of the original are disposed. The reflector surface may be elliptical in shape with the linear filament 61 at one focal point thereof, and the focal plane at the other focus of the ellipse. Resiliently mounted plungers 88 are provided in the carriage beneath the terminal caps 87 of the lamp 60, to urge the same upwardly against the tapered surfaces of the pointed screws 76.

At each end of the lamp are three points of contact with the end cap. The first point of contact, which is the plunger 88, urges the lamp and consequently the filament in a vertical direction. The pointed screws are equipped with serrated heads for easy manipulation. Again, referring to FIGURE 8, if it is desirous to move the lamp in a vertical direction in relation to the elliptical reflector, it is necessary only to loosen each pointed screw so that it rotates away from the end cap. By loosening each screw, the end of the lamp will be urged upward in a vertical direction.

To move the lamp in a horizontal direction, it is only necessary to tighten one screw and loosen the other at the same rate, which will then cause the end cap to move in a horizontal plane. Thus, the lamp may be moved in any direction, such for example as may be represented by the face of a clock, by the combination of tightening and loosening the pointed screws.

In order to determine whether a condition of parallelism has been obtained with respect to the reflector and whether the energy is directed at the focal plane, a measuring device may be used such as a solar cell placed on the surface of the glass to enable the operator to determine whether he has achieved a position of maximum energy being deflected to the solar cell, and if a condition of uniform intensity obtains across the width of exposure.

The carriage 62 may preferably be formed of an extrusion of aluminum or other metal of high heat conductivity, and the side and bottom surface thereof may be grooved to provide heat radiating fins 79, as shown in FIGURES 1 and 8. The front and rear rails 63 and 64 are of substantial cross section with regard to the weight of the carriage 62 so as to minimize any beam deflection. Thus, a construction is provided in which the filament 61 of the heat lamp is capable of extremely accurate focusing, such that it is maintained in a focal plane. The carriage on which the lamp is mounted is constructed so as to accommodate thermal expansion, thus avoiding stretches which would tend to bind on the rollers or otherwise vary the movement in a manner which would detract from a uniform rate of traverse. Thus, the ability to accurately focus the filament of the energy source and to maintain it in a parallel plane, the mounting of the carriage such as to accommodate thermal expansion and thus avoiding stresses which would tend to bind on the rollers or otherwise vary the friction of movement, which would detract from a uniform rate of traverse, combine to give an exposure device capable of extremely high quality reproductions in a thermal transfer process.

The Limit Switches

A pair of limit switches 80 and 81 are mounted by means of brackets 82 on the rear rail 64, as shown in FIGURES 3, 7 and 8. Each limit switch is provided with an actuated lever 83, which terminates in a roller 84. The actuating levers preferably are pivoted at their inner ends, with respect to the medial plane of the machine, and are depressed by a shoe 85, which is carried on the lower surface of the carriage 62, the cam surface of the shoe engaging one or the other of the rollers 84. As will hereinafter be described, actuation of the right hand limit switch 80 energizes the lamp 60 and the reverse drive of motor 34. The left hand limit switch 81, energizes relay 95 which de-energizes the control circuit, including, both the lamp 60 and drive motor 34 and then terminates the cycle.

The Vacuum System

The elements included in the vacuum system as shown in FIGURE 9 include in addition to the vacuum pump 32 and the vacuum frame 30, a two-way valve 90, a vacuum actuated brake 91, and a pressure responsive switch 92. The relationship of these elements is shown in FIGURE 9. After the pump 32 has been energized, and after a predetermined degree of vacuum has been built up, the pressure responsive switch 92 closes, and initiates the exposure operation. At the conclusion of the exposure operation, the vacuum release solenoid valve 90 is energized to release the vacuum, thus permitting the cover to be opened. The vacuum brake 91 is actuated when the vacuum is released to prevent overthrow of the carriage 62 beyond the limit switch 81, as will hereinafter be pointed out.

As shown in FIGURE 10, the closing of the cover switch 51 energizes the vacuum pump 32 and conditions the branch circuits which include the pressure responsive switch 92 and the vacuum release solenoid valve 90. Operation of the pressure responsive switch 92 starts the motor 34 and energizes the fixed resistance 140 shown in FIGURE 12. The motor drives the lamp source unlit on a forward pass at a rate of traverse which is fixed by the resistance 140. The cover switch also conditions the right and left hand limit switches 80 and 81.

As the carriage begins its forward pass, the left left hand limit switch 81 opens. The right hand limit switch 80 is closed as the lamp source completes its forward pass. Closing of limit switch 80 energizes the reversing relay 97, which also breaks the circuit to the fixed resistance 140 and transfers the current to the variable transformer 142, as best shown in FIGURE 12. The unidirectional relay 96 is also energized by the closing of the limit switch 80, as is also the lamp relay 139 which lights the lamp 60 through the step-up transformer 136.

The limit switch 80 is opened as the lamp begins its return exposure traverse. At the end of the return pass, the carriage closes the limit switch 81, which energizes the master relay 95, which in turn opens contacts 95a, 95b, 95c and 95d, to de-energize respectively the circuits including the vacuum pump 32, the lamp source 60, motor 34 and the reversing relay 97. The relay 95 also closes contact 95e to energize the circuit including the vacuum release solenoid valve 90, thus releasing the vacuum to permit the opening of the vacuum frame 30. The opening of the vacuum frame opens the cover switch 51 and de-energizes all circuits. A more particular explanation of the operation of the device is given with the description of the wiring diagram of FIGURE 11.

The Vacuum Brake

The overall width of the machine is reduced by providing brake means for counteracting the inertia of the rotating parts after the motor 34 has been de-energized. In other words, the brake means prevents physical overthrow of the carriage 62 beyond the limit switches 80 and 81. The brake means provided is shown in FIGURES 1, 3, 16 and 17. The left end of the lead screw 71 is provided with a disc 100, made of suitable friction material. Beneath the disc is located vacuum brake 91, which carries a brake shoe 101 in the form of a disc having a spherical upper surface 102.

The vacuum brake comprises a cylinder 103 and piston 104 the upper end of which terminates in a flange 105. The piston is slidably mounted in a vented closure 106 for the upper end of the cylinder 103. An actuating spring 107 is confined between the flange 105 and the closure 106. A stem 108 is slidably mounted in a bore 112 found in the upper end of the piston, the shoe 101 being carried thereby. A loading spring 109 surrounds the stem and is confined by the shoe and the piston flange 105 and tends to urge the brake shoe into contact with the disc 100 at all times to impose a drag on the drive mechanism. The shoe 101 and stem 108 are free to rotate about a vertical axis so that the spherical surface 102 will be maintained, the edge 113 of the disc tending to conform itself to the surface 102 to provide maximum contact area. The lower end of the cylinder 103 terminates in a fitting 110 to which a tube 111 is connected, the tube 111 communicating with the vacuum line 57 as shown in FIGURE 16.

In operation when the vacuum is established, the piston 104 will be displaced downwardly against the bias of the actuating spring 107, thus maintaining the brake inoperative. Upon release of the vacuum, the actuating spring 107 urges the brake shoe 101 upwardly into engagement with the disc 100, causing the drive screw 62 and the driving mechanism to come to a smooth stop, the force being transmitted from the piston to the brake shoe by the abutting engagement of the bottom of bore 112 with the bottom of the stem 108, however, even when the parts are in the retracted position as shown in FIGURE 16, the brake shoe 101 maintains a slight drag on the driving mechanism by virtue of the loading spring 109. This drag serves to mask minor variations in the load which might affect the uniformity of the rate of traverse of the carriage, hence promoting uniform exposure. Such variations may be caused by the effect of the temperature on bearings, lubricant, and the belt flexibility.

The Control Circuit

The control circuit is diagrammatically illustrated in FIGURE 11, the general operation of which has been outlined in connection with the description of FIGURE 10, the reference numerals 93 and 94 designating the line conductors, and the main switch 120 being interposed in conductor 93 to turn the device off and on. There are three main circuits connected between conductors 93 and 94 and which are in parallel with each other, the fan circuit 116 which includes the fan motor 26, the lamp power circuit 122 which includes the primary of the transformer 136, and an operating circuit 123, which includes the cover switch 51 and four branch circuits which are connected in parallel to each other and in series with the cover switch 51. The four branches of the operating circuit are the reversing relay circuit 124, the vacuum pump circuit 125, which includes the electrically operated vacuum pump 32, a controlled circuit 126 which includes the pressure responsive switch 92 and four branch circuits which are controlled thereby, and a vacuum release circuit 128 which includes a vacuum release solenoid 90.

The four branch circuits of the control circuit 126 comprises a lamp control circuit 129, which includes a lamp relay 139, a motor circuit 130 which includes a fixed resistance 140, the variable transformer 141, the direct current drive motor 34 and rectifiers 151 and 153 for the armature and field circuits respectively which provides direct current to the field circuits and armature circuits, the circuit for the bi-metallic heating element 131 and its switch 133, and the relay circuit 132 which includes the master relay coil 95 for actuating the normally closed contacts 95a, 95b, 95c and 95d, and the normally open contacts 95e and 95f. The relay circuit 132 includes two branch circuits which are connected parallel to each other, namely, a first limit switch circuit 134 which includes limit switch 81, and a second limit switch circuit 135 which includes limit switch 80. The limit switch circuits 134 and 135 are conditioned by the pressure responsive switch 92. The limit switch circuit 135 is energized when the right hand limit switch 80 is closed by the carriage, and thus relay 96 and relay 97 are energized. With respect to the unidirectional relay 96, the same controls two normally open contactors, namely 96a and 96b, the former having a series relation with the lamp relay 139, and the latter being connected in series with the limit switch 81 and master relay 95. Thus the lamp 60 is not energized until contactor 96a is closed. The closing of contactor 96b conditions circuit 134 for energization when the limit switch 81 is closed. The reversing relay 97 controls only one contactor, namely 97a as explained in connection with FIGURE 12.

Operation of the exposure device is initiated by closing of the switch 120 which energizes the fan motor 26 and conditions the lamp power circuit 122 and the operating circuit 123. The lamp power circuit includes the lamp 60 and the normally open contactor 139a, which is closed upon energization of the lamp control relay 139. The lamp 60 is connected into the secondary circuit 137 of the power transformer 136. The said relay 139 remains de-energized as long as contactor 96a is open, and as explained, the said contactor is closed when the carriage completes its initial pass from left to right which results in the closing of limit switch 80 and energization of relay 96. Closing of the vacuum frame 30 actuates the cover switch 51 to energize circuits 125, starting operation of the vacuum pump 32, and to condition circuits 126, 127, 130 and 132 for subsequent operation.

Assuming that the carriage 62 is in its extreme left hand position as viewed in FIGURE 3, it will be understood that the limit switch 81 will be closed and as described, the fan is operating and the vacuum pump is in the process of exhausting the space 38 to a pressure below atmospheric. As soon as a predetermined vacuum has been reached, such as 23 inches of mercury, at which the machine may be designed to operate, the vacuum responsive switch 92 will close, thereby energizing the drive motor 34 which now is operative for actuating the carriage 62 causing the same to travel from its extreme left hand position, FIGURE 3, to its extreme right hand position, thus completing an initial or a forward pass. The traverse of the carriage in this forward direction is governed by the fixed speed of the motor and the motor speed is controlled by the fixed resistance 140 now connected in circuit with the motor. Also, as the vacuum builds up and closes the vacuum responsive switch 92, the thermo-timer 131 is energized and the same begins its cycle. Initial movement of the carriage in the forward direction opens the limit switch 81 which, however, has no effect on the operation of the parts, since the switch circuit 134 is open by reason of contactor 96b being open.

The carriage completes its travel from left to right on its initial pass and upon reaching its right hand position the carriage actuates limit switch 80 to close the same. This energizes unidirectional relay 96 and also the reverse relay 97. With the energization of relay 96 the contactor 96a is closed so that relay 139 is energized to, in turn, energize the lamp 60. Contactor 96b is also closed and accordingly a holding circuit is completed for maintaining relay 96 and relay 97 energized, even through the limit switch 80 may be opened, which, of course, takes place as the carriage begins its travel in a return direction. Energization of the reversing relay 97 actuates contactor 97a, FIGURE 12, so that the same disconnects the fixed resistance 140 from the circuit of motor 34 and connects into said motor circuit the variable transformer 142. Actuation of said contactor 97a also reverses the direction of current flow to the armature of said motor 34. The variable transformer 142 controls the speed of the motor and thus the rate of travel of the carriage on its return and exposure pass.

Upon completion of the said return and exposure travel of the carriage, the same will contact the left hand limit switch 81 to close the same and as a result the master relay 95 is now energized through circuit 134, since both the limit switch 81 and the contactor 96b are closed. Energization of the master relay 95 results in the opening of the normally closed contacts 95a, 95b, 95c and 95d. Accordingly the vacuum pump motor is de-energized and the vacuum pump is caused to stop. The lamp relay 139 is also de-energized due to opening of contactor 95b so that the lamp is extinguished. The motor 34 is caused to stop due to the fact that the motor circuit is opened by the contactor 95c, and with the opening of contactor 95d the reversing relay 97 is also de-energized.

Along with the energization of master relay 95 two normally open contactors are closed, namely 95e and 95f. The former closes circuit 128 to energize the solenoid valve 90 and as a result the valve operates to release the vacuum within the vacuum frame 30. This action initiates operation of the vacuum brake 91 which facilitates stopping of the motor as soon as the same is de-energized. Also, release of the vacuum within the frame will cause opening of the vacuum switch 92 which brings the space 38 to an atmospheric condition and allows the frame to be lifted. It will be appreciated that the opening of vacuum switch 92 would de-energize the master relay 95, and hence tend to cause re-cycling if the cover switch 51 is not immediately opened. Such would be the case since the vacuum pump 32 and the reversing relay 97 would be operative for another forward pass of the carriage as soon as relay 95 is de-energized. Therefore, a holding circuit 127 is provided having a connection in parallel with the vacuum switch. With the energization of relay 95 the normally open contactor 95f is closed to establish the holding circuit 127 thereby maintaining the master relay 95 energized until the frame 30 is lifted to open the cover switch 51. The fan 26 continues to run until the power switch 120 is opened.

In the event of motor failure or the occurrence of other conditions which would tend to delay the completion of the cycle and hence possibly retain the lamp in an energized condition for an undue period, the contactor 133 of the thermo timer 131 will close and energize the master relay 95. Accordingly, energization of the master relay will terminate the exposure operation and thus the parts are prevented from damage such as might be due to excessive heat.

As shown in FIGURE 12 the drive motor 34 is a direct current motor operating on power supplied by the motor circuit 130. The motor comprises an armature 150 which is connected across the terminals of a full way rectifier 151. The shunt field 152 of the motor is connected across the terminals of a full way rectifier 153. The reversing switches 154 and the contactor 97a are provided for reversing the polarity of the armature 150 and for switching the fixed resistance 140 and the variable transformer 142. Variable speed and hence exposure control is obtained by regulating the voltage impressed upon the armature. This is accomplished by the variable transformer which has a sliding tap identified by numeral 155.

*Operation*

The operation of the printing device has been described in detail in connection with the description of the various parts in said assemblies. When it is desired to make a printed copy, the vacuum frame 30 is first raised, the power switch 120 is thrown to "on", and the original and copy and transfer sheet are superimposed on the glass plate 31 in the desired relationship. After the sheets have been positioned, the vacuum frame 30 is lowered, thus providing a seal around the entire superimposed assembly with the exhaust opening being located inside the space 38. The exhaust line is connected to the nipple from the vacuum pump 32 through which the air is exhausted as the pump is started. As soon as the proper degree of vacuum has been reached, the pressure responsive switch 92 will close, thereby causing the carriage to move from left to right in a forward pass. This pass is accomplished at a traverse speed which is fixed in accordance with the fixed resistor in the motor circuit. As the carriage reaches the right hand position, the lamp is energized and the rotation of the motor is reversed and the current takes its alternate pass through the variable transformer which determines the exposure pass of the energy source as preset by the operator of the device. This exposure control is effected by shifting the sliding tap 155 of the variable transformer 142 to control the rate of traverse. The uniform rate of traverse, which is one of the most critical requirements of uniform copy density, sharpness of letdown, and a minimum of background pickup is promoted by the unique truck mounting of the carriage wherein the front truck rides in a fixed V-shaped groove in conjoint operation with a rear truck permitting thermal expansion of the carriage within the mounting on the truck so as to avoid distortion and maintain the truck parallel and thereby minimizing the effect of variations of friction and other mechanical operating conditions.

The pressure urging the superimposed sheets into intimate contact is a force which does not deflect or distort the transparent support base 31, since the pressure is obtained by evacuating the cavity identified by numeral 38. Thus the force which urges the sheets into contact is that of atmospheric pressure. A study of the forces on either side of the transparent support base will show equal atmospheric pressure is being exerted on the top of the plate as well as on the bottom. By this technique of employing vacuum means, pressures as high as twelve pounds per square inch may be applied to the superimposed sheets without this force resulting in any deflection of the glass plate. Whereas, if a positive pressure force were to be used, the force could not exceed six to seven pounds per square inch without necessitating special types of transparent support material to resist deflection and even breaking of the glass surface. The necessity of maintaining the transparent support base in a plane is essential to the proper focusing of the radiant energy source, since it is accordingly possible to maintain the transparent sheet supporting base and the carriage in parallel planes for the entire travel of the radiant energy source.

Uniform intensity of the energy source is obtained by the unique, but uncomplicated structure for focusing the filament with the lamp reflector. At the conclusion of the exposure operation, the vacuum frame is released and the operator raises the vacuum frame without disturbing the superimposed sheets so as not to prematurely cause any separation between the transfer and copy sheet. The ability to so raise the vacuum frame is the result of the unique tension mounting of the blanket and the use of the interposed porous cushion. Upon raising the vacuum frame 30, all the circuits are conditioned for a subsequent operating cycle by the opening of the cover switch 51.

Although the preferred embodiment of this invention is shown and described herein, it will be obvious that various modifications and changes may be made in the construction shown without departing from the spirit of the invention as pointed out in the appended claims.

What is claimed is:

1. In a vacuum frame type of exposure device, the combination including a vacuum frame movable into and from an operative position, a source of radiant energy mounted for reciprocating movement with respect to the frame between two terminal positions, driving means for effecting movement of the radiant energy source, a vacuum pump for producing a vacuum within the frame upon operation of the pump, a pressure responsive switch having a closing action when a predetermined vacuum exists in the vacuum frame, a terminal switch located at each terminal position and being actuated to close by movement of the radiant energy source into the said terminal positions respectively, and control means including a unidirectional relay, a reversing relay for the said driving means, a master relay, and a cover switch actuated into a closed position by movement of the vacuum frame into an operative position, a first circuit including said unidirectional and reversing relays and one of the terminal switches and being connected in series with the cover switch, a second circuit including the master relay, the other terminal switch and a normally open contactor which is caused to close upon energization of the unidirectional relay, said second circuit being connected in series with the pressure responsive switch and the cover switch, and a holding circuit for the unidirectional and reversing relays, said holding circuit connecting the first and second circuits and including the said contactor, the pressure responsive switch and the cover switch.

2. In a vacuum frame type of exposure device, the combination including a vacuum frame movable into and from an operative position, a source of radiant energy mounted for reciprocating movement with respect to the frame between a first and a second terminal position, a vacuum pump for producing a vacuum within the frame upon operation of the pump, a pressure responsive switch having a closing action when a predetermined vacuum exists in the vacuum frame, a first and second terminal switch located at the first and second terminal positions respectively, and being actuated to close by movement of the radiant energy source into said terminal positions respectively, and a control circuit including a unidirectional relay, a master relay and a cover switch actuated into a closed position by movement of the vacuum frame into an operative position, a first circuit including the unidirectional relay and the second terminal switch and being connected in series with the cover switch, a second circuit including the master relay, the first terminal switch and a normally open contactor which is caused to close upon energization of the unidirectional relay, said second circuit being connected in series with the pressure responsive switch and the cover switch, and a holding circuit for the unidirectional relay including the said contactor, whereby both relays remain un-energized during movement of the radiant energy source from a first to a second terminal position even though the pressure responsive switch and cover switch are closed, whereby the unidirectional relay is energized when the radiant energy source reaches its second terminal position since the second terminal switch is thus closed, and whereby the master relay is energized when the radiant energy source returns to its first terminal position to close the first terminal switch since the contactor remains closed by reason of the holding circuit.

3. A vacuum frame type of exposure device as defined by claim 2, wherein the energization of the unidirectional relay effects energization of the radiant energy source, wherein energization of the master relay effects de-energization of the said source, and wherein opening of the cover switch de-energizes the unidirectional relay with de-energization of the master relay being effected by opening of either the pressure responsive switch or the cover switch.

4. In a vacuum frame type of exposure device, the combination including a vacuum frame movable into and from an operative position, a source of radiant energy mounted for reciprocating movement with respect to the frame between spaced terminal positions, driving means for effecting movement of the radiant energy source, a source of electric current, a motor circuit for the driving means having connection with the source of electric current, a first and a second terminal switch located at the terminal positions respectively and being actuated to close by movement of the radiant energy source into the said terminal positions, a reversing switch for the motor circuit, a control circuit including the terminal switches and a reversing relay for effecting actuation of the reversing switch, a contactor controlled by the reversing relay, a resistance element having a fixed value in ohms, and inductance means equipped with a slidable tap connection, said contactor in one position connecting the fixed resistance into the motor circuit for the driving means to thereby supply said driving means with a fixed energy input and said contactor in its other position connecting the slidable tap into the motor circuit for said driving means whereby the energy input to said driving means may be regulated.

5. A vacuum frame type of exposure device as defined by claim 4, additionally including a unidirectional relay in parallel with the reversing relay and series connected to one of the terminal switches to form therewith a first circuit, a second circuit including a master relay, the other terminal switch and a contactor which is closed when the unidirectional relay is energized, whereby the unidirectional and reversing relays are energized when said one of the terminal switches is closed, a holding circuit for the unidirectional and reversing relays including the contactor which upon closing conditions the second circuit, whereby the master relay is energized when the other terminal switch is closed, and another contactor connected in the said motor circuit and being actuated into an open position upon energization of the master relay.

6. In a vacuum frame type of exposure device comprising a transparent sheet supporting base, a vacuum frame removably disposed above the base and having an operative and an inoperative position with said base, a radiant energy source located below the base, means for slidably mounting said energy source for movement between two terminal positions, said means comprising longitudinally extending rails and a carriage for said energy source supported by the rails, a rotatable drive screw engaging said carriage, electric motor means for rotating the drive screw, a limit switch located at each of said terminal positions and actuated by said carriage means, a vacuum release valve for releasing the vacuum within the vacuum frame when the valve is energized, a unidirectional relay and a reversing relay in series circuit with one of said limit switches, a master relay in series circuit with the other limit switch, and control circuit means for said relays and limit switches whereby the actuation of said one of the limit switches by the carriage to close the same energizes the unidirectional and reversing relays and actuation of the other limit switch by the carriage to close the same energizes the master relay, said control circuit means also effecting energization of the radiant energy source when the unidirectional relay is energized, the said reversing relay upon being energized effecting a reversal in the direction of rotation of the drive screw, and said master relay upon being energized effecting a de-energization of the radiant energy source, de-energization of the motor means to stop rotation of the drive screw and an energization of the vacuum release valve.

7. A vacuum frame type of exposure device as defined by claim 6 additionally including a cover switch and pressure responsive switch in the control circuit means, said cover switch closing when the vacuum frame is operatively positioned with respect to the transparent sheet supporting base and conditioning the electric motor means for energization, and said pressure responsive switch closing when a predetermined vacuum exists in the operatively positioned vacuum frame and effecting an energization of the said motor means.

8. A vacuum frame type of exposure device comprising a framework, a transparent sheet supporting base mounted on said framework, a vacuum frame removably disposed on said framework above said base, a radiant energy source located beneath said base, and means for slidably mounting said energy source for movement between two terminal positions, said means comprising two longitudinally extending rails, a truck riding on each rail, a carriage for said energy source supported by said trucks, means securing said carriage to only one of said trucks so as to accommodate thermal expansion of said carriage, a drive screw disposed between said rails and extending parallel thereto, a nut cooperating with said drive screw, a ball pin carried by said nut, and a bushing located in the lower surface of said carriage, said ball pin being received within said bushing to accommodate thermal expansion of said carriage in a direction transverse to the axis of said drive screw.

9. An exposure device comprising a transparent sheet supporting base, a vacuum frame removably disposed above said base and having operative and inoperative position therewith, a travelling filament type energy source equipped with end caps, said energy source being located beneath said base and movable between spaced terminal positions, driving means for reciprocating said energy source between said terminal positions for effecting exposure of one of a plurality of superimposed sheets supported by the base, supporting means for supporting the energy source for said reciprocating movement between the terminal positions, said supporting means comprising a pair of spaced longitudinally extending rails, a truck riding on each rail, and a carriage supported at its ends by said trucks but fixed to one truck only so as to permit longitudinal expansion and contraction of the carriage, a reflecting surface provided by the carriage and shaped to contain the energy source, and a set of opposing screws mounted by the carriage at respective ends thereof for engaging the terminal end caps of the energy source, whereby to releasably hold the energy source in operative relation within the carriage.

10. An exposure device as defined by claim 9 additionally including a plunger mounted by the carriage at respective ends and located below the set of opposing screws at its end, and means yieldingly biasing each plunger into contact with an end cap of the energy source, whereby the screws in cooperation with the yieldingly biased plungers provide for adjustment of the energy source for the proper focusing of the same with respect to the sheet supporting base.

11. In a vacuum frame type of exposure device, the combination including a transparent sheet supporting base and a vacuum frame movable into and out of an operative position with respect to said base, of a reciprocable carriage and a radiant energy source supported by the carriage, a front rail and a rear rail located below the sheet supporting base for mounting the carriage for reciprocating movement between spaced terminal positions, driving means for reciprocating said carriage to effect an exposure, front and rear truck means for supporting said carriage at its respective ends in a position transverse to said rails, said front truck means being equipped with wheels which ride in a groove on said front rail, said rear truck means being equipped with flanged wheels having a straddling relation with said rear rail, said carriage being fixedly mounted to said front truck means only, and a ball pin and socket arrangement providing the only connection between the driving means and the carriage.

References Cited in the file of this patent

UNITED STATES PATENTS

| | | |
|---|---|---|
| 1,682,845 | Koppe | Sept. 4, 1928 |
| 2,153,186 | Henderson | Apr. 4, 1939 |
| 2,427,923 | Reynolds | Sept. 23, 1947 |
| 2,614,469 | Hillmer | Oct. 21, 1952 |
| 2,739,516 | Hosterman | Mar. 27, 1956 |
| 2,869,447 | Young Berg | Jan. 20, 1959 |
| 2,941,461 | Ludwig | June 21, 1960 |